United States Patent [19]

Hicks

[11] 4,325,446

[45] Apr. 20, 1982

[54] VEHICLE WITH ADJUSTABLE SEAT

[75] Inventor: John E. Hicks, Lincoln, Nebr.

[73] Assignee: Outboard Marine Corporation, Waukegan, Ill.

[21] Appl. No.: 118,537

[22] Filed: Feb. 4, 1980

[51] Int. Cl.³ ............................................. B62D 23/00
[52] U.S. Cl. .................................... 180/89.17; 296/63; 297/193
[58] Field of Search ...................... 180/89.17; 248/423, 248/424, 429; 108/44; 297/193, 216; 296/35.1, 63

[56] References Cited

U.S. PATENT DOCUMENTS

| | | | |
|---|---|---|---|
| 2,628,657 | 2/1953 | Orrick | 248/429 |
| 3,261,422 | 7/1966 | Jensen | 180/89.17 |
| 3,394,772 | 7/1968 | Abold | 180/89.17 |
| 3,446,469 | 5/1969 | Whitten | 108/44 |
| 3,583,518 | 6/1971 | Bichel | 180/89.17 |
| 3,939,986 | 2/1976 | Pierro | 108/44 |
| 3,977,725 | 8/1976 | Tengler | 297/216 |
| 4,154,422 | 5/1979 | Muhr | 297/216 |

FOREIGN PATENT DOCUMENTS 10109 of 1889 United Kingdom ............ 180/89.17

Primary Examiner—Joseph F. Peters, Jr.
Assistant Examiner—John A. Carroll
Attorney, Agent, or Firm—Michael, Best & Friedrich

[57] ABSTRACT

Disclosed herein is a vehicle comprising a frame including a substantially closed engine compartment including an access opening, an engine supported on the frame in the compartment, a seat, and cooperating elements for removably and adjustably supporting the seat in overlying relation to the engine comprising a pair of spaced elongated parallel guides partially defining the access opening, a mounting platform connected to the seat, and interengaging structure on the mounting platform and on the guides for supporting the platform so as to at least partially close the engine access opening, for guiding movement of the platform in the direction of elongation of the guides, and for removably and adjustably fixedly positioning the platform with respect to the guides.

5 Claims, 4 Drawing Figures

U.S. Patent   Apr. 20, 1982   4,325,446
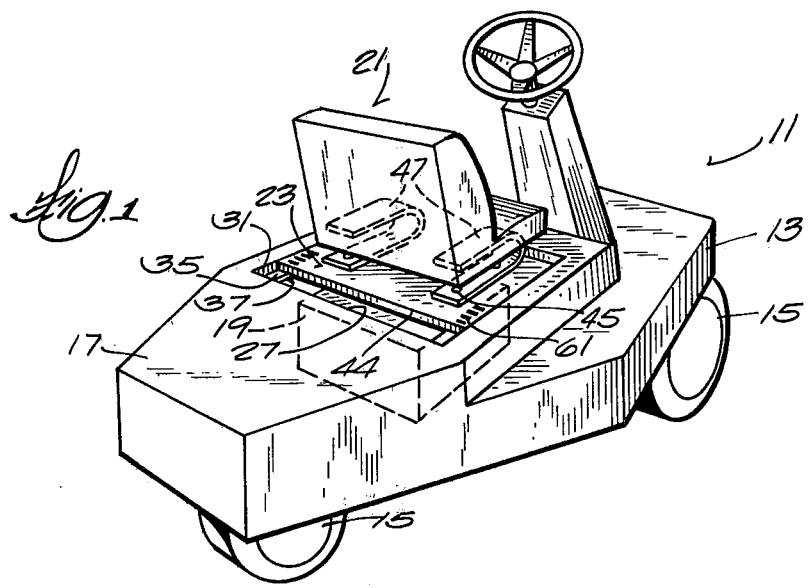
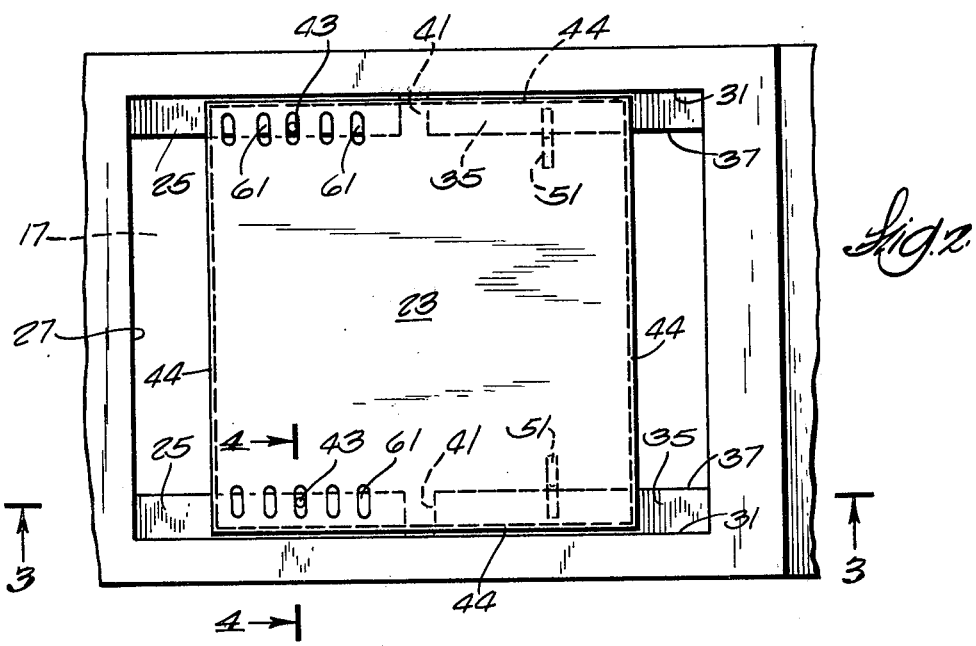
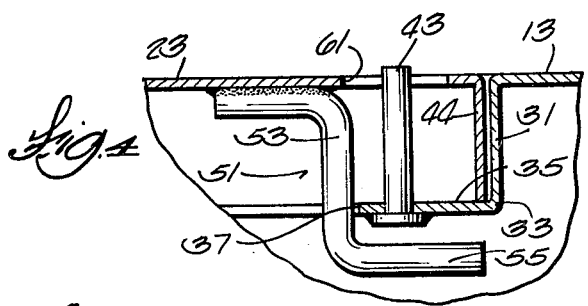
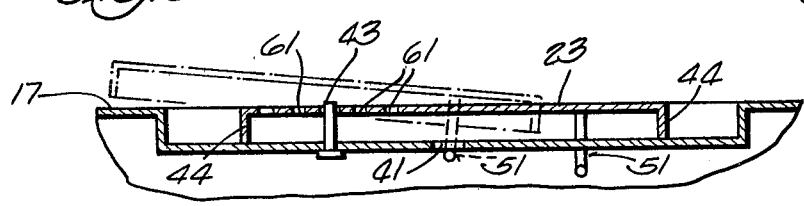

4,325,446

VEHICLE WITH ADJUSTABLE SEAT

BACKGROUND OF THE INVENTION

The invention relates generally to vehicles, and more particularly, to a vehicle seat mounting arrangement.

Attention is directed to the U.S. Albright Pat. No. 1,873,525 issued Aug. 23, 1932 and to British Pat. No. 10,109 issued June 20, 1889.

SUMMARY OF THE INVENTION

The invention provides a vehicle comprising a frame including a substantially closed engine compartment including an access opening, an engine supported on the frame in the compartment, a seat, and means for removably and adjustably supporting the seat in overlying relation to the engine comprising a pair of spaced elongated parallel guides partially defining the access opening, a mounting platform connected to the seat, and means on the mounting platform and on the guides for supporting the platform so as to at least partially close the engine access opening, for guiding movement of the platform in the direction of elongation of the guides, and for removably and adjustably fixedly positioning the platform with respect to the guides.

In one embodiment in accordance with the invention, the means on the guides and on the platform includes a generally vertical surface on each of the guides and a horizontal shelf on each of the guides extending from the vertical surface, which horizontal shelves extend toward each other, respective forwardly located notches extending inwardly of the shelves from the inner edges thereof toward the vertical surfaces, respective studs projecting upwardly from each of the horizontal shelves in rearwardly spaced relation from the notches, a pair of horizontal spaced forwardly located and laterally aligned hooks extending downwardly from the platform, each hook including a vehicle leg and a horizontal leg extending outwardly from the vertical leg, which hooks are horizontally spaced and dimensioned to pass through the notches when the platform is located on the guides so as thereby to locate the horizontal legs underneath the horizontal shelves, and a horizontally spaced pair of a series of apertures located in the platform rearwardly of the hooks, which apertures in each of the series are spaced from one other in the direction of elongation of the guides and are individually adapted for receipt of one of the studs.

The invention also provides a vehicle comprising a frame, a seat, and means removably supporting the seat on the frame comprising a pair of spaced elongated parallel guides each including a generally vertical surface having a bottom edge and a horizontal shelf extending from the bottom edge, which horizontal shelves extend toward each other, each of the horizontal shelves including an inner edge and a notch extending inwardly therefrom toward the vertical surface, respective pins projecting upwardly from each of the horizontal shelves in rearwardly spaced relation from the notches, and a mounting platform carrying the seat and including a pair of horizontally spaced forwardly located hooks each including a downwardly extending leg and a horizontal leg extending outwardly from the downwardly extending leg, which hooks are horizontally spaced and dimensioned to pass the horizontal legs through the notches in response to placement of the platform onto the guides so as thereby to locate the horizontal legs underneath the horizontal shelves, which platform also includes a pair of horizontally spaced series of apertures located rearwardly of the hooks, which apertures in each of said series are spaced from one another in the direction of elongation of the guides and are individually adapted for receipt of one of the pins.

Other features and advantages of the embodiment of the invention will become apparent upon reviewing the following general description and the appended claims.

DESCRIPTION OF THE DRAWINGS

FIG. 1 is a perspective view of a vehicle embodying various of the features of the invention.

FIG. 2 is a fragmentary enlarged plan view of a portion of the vehicle shown in FIG. 1.

FIG. 3 is a fragmentary sectional view taken along line 3—3 of FIG. 2.

FIG. 4 is a fragmentary sectional view taken along line 4—4 of FIG. 2.

Before explaining one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Shown in FIG. 1 is a vehicle 11 which comprises a frame 13 which is supported by a plurality of wheels 15, i.e., three or more. Supported on the frame 13, preferably in a substantially closed compartment 17 formed by the frame 13, is an engine 19 which can be drivingly connected to one or more of the wheels 15 in any convenient manner and which can be controlled in any convenient manner.

Also included on the vehicle 11 is a seat 21 which is removably and adjustably supported on the frame 13 in overlying relation to the engine 19. Except for connection of the seat 21 to a platform 23 to be hereinafter described, the seat can be of any suitable construction.

Means are provided for removably supporting the seat 21 on the frame 13 in overlying relation to the engine 19 and for adjusting the seat 21 through a range of positions relative to the frame 13. While other arrangements can be employed, in the illustrated construction, the vehicle frame 13 includes a pair of horizontally spaced, generally parallel elongated guides or guideways 25 which define therebetween an access opening 27 into the otherwise substantially closed engine compartment 17 from the top thereof.

More particularly, each guide 25 comprises a vertical surface 31 having a bottom edge 33 and a horizontal shelf, or surface, or pan 35 which extends inwardly from the bottom edge 33. The shelves 35 have respective inner edges 37 spaced apart at a distance less than the horizontal spacing of the vertical surfaces 31.

The horizontal shelves 35 also respectively include forwardly located, laterally aligned, edge notches 41 which extend outwardly from the inner edges 37 toward the vertical surfaces 31. In addition, each of the horizontal shelves 35 has thereon an upwardly or vertically extending stud or pin 43 which is located in rearwardly spaced relation from the notch 41 in the associated shelf 35.

The means for removably and adjustably mounting the seat 21 also includes the before mentioned platform 23 which can include peripheral downturned flanges 44 and which supports the seat 21 as by use of one or more bolts 45 connected to U-legs 47 or the like and which is generally of rectangular shape, having a width slightly less than the spacing between the vertical surfaces 31. Accordingly, the platform 23 can be lowered into position on the shelves 35 and adjustably moved forwardly and rearwardly, the platform 23 being supported vertically on the shelves 35 and guided for fore and aft movement between a plurality of positions by the vertical surfaces 31.

The means for removably and adjustably mounting the seat 21 also includes a pair of forwardly located, horizontally spaced, and laterally aligned hooks 51 which project downwardly from the respective sides of the platform 23 and which include vertical legs 53 and outwardly extending horizontal legs 55 projecting from the bottom of the vertical legs 53. When the hooks 51 are aligned with the notches 41, the outwardly projecting legs 55 can pass downwardly through the notches 41 and, in response to platform movement along the shelves 35, the horizontal legs 55 move in paths in closely adjacent and underlying relation to the horizontal shelves 35. Such underlying relation of the legs 55 to the shelves 35 prevents removal of the platform 23 from the guides 25 except when the platform 23 is positioned to permit withdrawal of the hooks 51 through the notches 41.

The means for removably and adjustably mounting the seat also includes, in the platform 23, a laterally or horizontally spaced pair of a series of apertures 61, which apertures are spaced in the direction of the guides 25 and are individually adapted for receipt of one of the studs 43 so as to prevent movement of the platform 23 lengthwise of the guides 25.

Adjustment of the fore and aft position of the seat 21 relative to the guides 25 can be obtained after the hooks 51 are inserted through the notches 41 and by movement of the platform 23 along the shelves 35 and between the vertical surfaces 31 to the desired position which will accomodate respective insertion of the studs 43 into the desired one of the apertures 61 in each series. By lifting the rearward end of the platform 23 and moving the platform 23 fore and aft, the seat 21 can be adjustably located into another position in which the studs or pins 43 are respectively received in another laterally aligned pair of apertures 61.

Thus, there is provided an arrangement for removably and adjustably supporting the seat 21 in overlying relation to the engine 19 and, at the same time, providing a removable cover (in the form of the platform 23) for the engine compartment 17, whereby the engine compartment 17 can be closed as desired while also affording access to the compartment 17 as desired by removing the seat 21. In addition, as has already been noted, the location of the seat 21 can be adjusted on the frame 13 between a range of positions as may be desired. Still further, it is particularly noted that the construction affords the advantages mentioned above while permitting economy of manufacture.

Various of the features of the invention are set forth in the following claims.

I claim:

1. A vehicle comprising a frame including a substantially closed engine compartment including an access opening, an engine supported on said frame in said compartment, a seat, and means for removably and adjustably supporting said seat in overlying relation to said engine comprising a pair of spaced elongated parallel guides on said frame and partially defining said access opening, a mounting platform connected to said seat, and means on said mounting platform and on said guides for supporting said platform so as to at least partially close said engine access opening, for guiding movement of said platform in the direction of elongation of said guides, and for removably and adjustably fixedly positioning said platform with respect to said guides.

2. A vehicle in accordance with claim 1 wherein said means on said guides and on said platform includes a generally vertical surface on each of said guides and a horizontal shelf on each of said guides extending from said vertical surface, said horizontal shelves extending toward each other, wherein said means on said guides and on said platform also includes respective forwardly located notches extending inwardly of said shelves from the inner edges thereof toward said vertical surfaces, wherein said means on said guides and on said platform also includes respective studs projecting upwardly from each of said horizontal shelves in rearwardly spaced relation from said notches, wherein said means on said guides and on said platform also includes a pair of horizontal spaced forwardly located and laterally aligned hooks extending downwardly from said platform, each hook including a vertical leg and a horizontal leg extending outwardly from said vertical leg, said hooks being horizontally spaced and dimensioned to pass through said notches when said platform is located on said guides so as thereby to locate said horizontal legs underneath said horizontal shelves, and wherein said means on said guides and on said platform also includes a horizontally spaced pair of a series of apertures located in said platform rearwardly of said hooks, said apertures in each of said series being spaced from each other in the direction of elongation of said guides and being individually adapted for receipt of one of said studs.

3. A vehicle comprising a frame including a substantially closed engine compartment including an access opening, an engine supported on said frame in said compartment, a seat, and means for removably and adjustably supporting said seat on said frame in overlying relation to said engine comprising a pair of spaced elongated parallel guides on said frame and partially defining said access opening, each of said guides including a generally vertical surface having a bottom edge, and a horizontal edge extending from said bottom edge, said horizontal shelves extending toward each other from said bottom edges, each of said horizontal shelves including an inner edge and a forwardly located notch extending inwardly therefrom toward said vertical surface, respective pins projecting upwardly from each of said horizontal shelves in rearwardly spaced relation from said notches, and a mounting platform connected to said seat and including a pair of horizontally spaced forwardly located hooks each including a downwardly extending leg and a horizontal leg extending outwardly from said downwardly extending leg, said hooks being horizontally spaced and dimensioned to pass said horizontal legs through said notches in response to placement of said platform onto said guides so as thereby to locate said horizontal legs underneath said horizontal shelves, said platform also including a horizontally spaced pair of a series of apertures located rearwardly of said hooks, said apertures in each of said series being spaced from each other in the direction of elongation of said guides and being individually adapted for receipt of one of said pins.

4. A vehicle comprising a frame, a seat, and means removably supporting said seat on said frame comprising a pair of spaced elongated parallel guides on said frame, each of said guides including a generally vertical surface having a bottom edge and a horizontal shelf extending from said bottom edge, said horizontal shelves extending toward each other from said bottom edges, each of said horizontal shelves including an inner edge and a notch extending inwardly therefrom toward said vertical surface, respective pins projecting upwardly from each of said horizontal shelves in rearwardly spaced relation from said notches, and a mounting platform carrying said seat and including a pair of horizontally spaced forwardly located hooks each including a downwardly extending leg and a horizontal leg extending outwardly from said downwardly extending leg, said hooks being horizontally spaced and dimensioned to pass said horizontal legs through said notches in response to placement of said platform onto said guides so as thereby to locate said horizontal legs underneath said horizontal shelves, said platform also including a pair of horizontally spaced series of apertures located rearwardly of said hooks, said apertures in each of said series being spaced from one another in the direction of elongation of said guides and being individually adapted for receipt of one of said pins.

5. A vehicle in accordance with claim 4 wherein said frame includes an engine compartment which encloses said engine and which includes an access opening partially defined by said guides and closed by said platform so as to locate said seat in overlying relation to said engine.

* * * * *